United States Patent
Kono et al.

(10) Patent No.: US 9,521,092 B2
(45) Date of Patent: Dec. 13, 2016

(54) TRANSPORT SYSTEM AND TRANSPORT METHOD

(71) Applicant: HITACHI, LTD., Tokyo (JP)

(72) Inventors: Masashi Kono, Tokyo (JP); Hidehiro Toyoda, Tokyo (JP); Satoshi Tsutsumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 14/477,951

(22) Filed: Sep. 5, 2014

(65) Prior Publication Data

US 2015/0085877 A1 Mar. 26, 2015

(30) Foreign Application Priority Data

Sep. 25, 2013 (JP) ................................. 2013-198574

(51) Int. Cl.
*H04L 12/931* (2013.01)

(52) U.S. Cl.
CPC ................................. *H04L 49/208* (2013.01)

(58) Field of Classification Search
CPC ...... H04L 12/46; H04L 41/0893; H04L 45/58; H04L 45/586; H04L 47/10; H04L 49/109; H04L 49/15; H04L 49/245; H04L 49/351; H04L 49/352; H04L 49/357; H04L 49/70; H04L 49/90; H04L 69/14; H04N 7/10; H04N 21/4383
See application file for complete search history.

(56) References Cited

U.S. PATENT DOCUMENTS

| 5,463,621 A * | 10/1995 | Suzuki | H04L 45/10 370/399 |
| 6,839,794 B1 * | 1/2005 | Schober | H04L 45/302 370/229 |
| 7,319,669 B1 * | 1/2008 | Kunz | H04L 12/5693 370/235 |

(Continued)

FOREIGN PATENT DOCUMENTS

| JP | 2003-143097 A | 5/2003 |
| JP | 2006-253852 A | 9/2006 |

(Continued)

*Primary Examiner* — Michael Thier
*Assistant Examiner* — Eric Nowlin
(74) *Attorney, Agent, or Firm* — Mattingly & Malur, PC

(57) ABSTRACT

A transport system comprises 2 apparatuses. The first transport apparatus notifies, for each of first physical ports, to the second transport apparatus, a valid first lane count and identification information of the first physical port. The second transport apparatus is configured to: obtain, for each of second physical ports, a valid second lane count and identification information of the second physical port; associate, based on the valid second lane count and the identification information of the second physical port, and the valid first lane count and the identification information of the first physical port, the identification information of the first and second physical port; and transmit, when data including identification information of one of the first physical ports is transmitted, the data from the second physical port that is identified by the identification information associated with the identification information of the one of the first physical ports.

7 Claims, 14 Drawing Sheets

(56) References Cited

U.S. PATENT DOCUMENTS

| | | | | |
|---|---|---|---|---|
| 7,536,473 | B2* | 5/2009 | Ajanovic | G06F 13/124 370/229 |
| 7,656,898 | B2* | 2/2010 | Ko | H04L 47/10 370/468 |
| 7,974,278 | B1* | 7/2011 | MacAdam | H04L 47/10 370/389 |
| 8,014,387 | B2* | 9/2011 | Arimilli | G06F 9/5061 370/353 |
| 8,089,971 | B1* | 1/2012 | Kunz | H04L 47/10 370/235 |
| 9,071,559 | B1* | 6/2015 | Dropps | H04L 49/90 |
| 2002/0085493 | A1* | 7/2002 | Pekkala | H04L 47/10 370/235 |
| 2003/0081710 | A1 | 5/2003 | Takeuchi et al. | |
| 2003/0193942 | A1* | 10/2003 | Gil | H04L 49/90 370/389 |
| 2003/0223416 | A1* | 12/2003 | Rojas | H04L 49/25 370/389 |
| 2005/0060445 | A1* | 3/2005 | Beukema | H04L 47/30 710/52 |
| 2006/0087989 | A1* | 4/2006 | Gai | H04L 12/413 370/299 |
| 2006/0203847 | A1 | 9/2006 | Toyoda | |
| 2007/0248102 | A1* | 10/2007 | Wang | H04L 47/10 370/395.42 |
| 2007/0268931 | A1* | 11/2007 | Shaikli | H04J 3/047 370/468 |
| 2008/0232818 | A1 | 9/2008 | Narita et al. | |
| 2010/0128607 | A1* | 5/2010 | Dropps | H04L 49/506 370/235 |
| 2010/0246389 | A1 | 9/2010 | Toyoda et al. | |
| 2011/0261682 | A1* | 10/2011 | Han | H04L 12/413 370/225 |
| 2012/0066531 | A1* | 3/2012 | Shafai | H04W 52/0206 713/323 |
| 2013/0064115 | A1 | 3/2013 | Toyoda et al. | |
| 2013/0283108 | A1 | 10/2013 | Kono et al. | |
| 2014/0286346 | A1* | 9/2014 | Ghiasi | H04L 45/60 370/401 |
| 2015/0281129 | A1* | 10/2015 | Kono | H04L 49/70 370/359 |

FOREIGN PATENT DOCUMENTS

| | | |
|---|---|---|
| JP | 2008-227995 A | 9/2008 |
| JP | 2010-232787 A | 10/2010 |
| JP | 2011-199361 A | 10/2011 |
| JP | 2011-211532 A | 10/2011 |
| JP | 2012-134798 A | 7/2012 |
| JP | 2013-062687 A | 4/2013 |
| JP | 2013-223157 A | 10/2013 |

* cited by examiner

| HEADER | M0 | M1 | M2 | BIP3 | M4 | M5 | M6 | BIP7 |

M0: OWN PHYSICAL PORT NUMBER + LOCAL TRANSMISSION/REMOTE DEALING IDENTIFIER
M1: VALID LANE COUNT OF LOCAL + MASTER/SLAVE IDENTIFIER
M2: PHYSICAL PORT NUMBER OF REMOTE + UPDATE OK/UPDATE NG IDENTIFIER
M4: BIT-WISE INVERSION OF M0
M5: BIT-WISE INVERSION OF M1
M6: BIT-WISE INVERSION OF M2
BIP3: BIT PARITY VALUE OF TRANSMISSION DATA
BIP7: BIT-WISE INVERSION OF BIP3

TRANSPORT SYSTEM AND TRANSPORT METHOD

CLAIM OF PRIORITY

The present application claims priority from Japanese patent application JP 2013-198574 filed on Sep. 25, 2013, the content of which is hereby incorporated by reference into this application.

BACKGROUND OF THE INVENTION

This invention relates to transport of signals of different protocols.

With the increase in communication traffic, networks are being demanded to be faster and larger in capacity. Large-capacity transport owing to data multiplexing has come to be used in backbone communication networks that connect line concentrators, bases, or providers' networks to each other. Examples of this large-capacity transport include Synchronous Digital Hierarchy/Synchronous Optical Network (SDH/SONET) in which low-rate signals are multiplexed into a signal of a predetermined rate to be transported as the signal, and Optical Transport Network (OTN) which accomplishes large-capacity transport by employing the concept of an optical path that is suitable for wavelength division multiplexing (WDM).

A problem of the large-capacity transport network technologies described above is that accommodating a plurality of signals makes the apparatus configuration large. In this situation, for example, in JP 2003-143097 A, there is disclosed a technology in which the detection of synchronization among a plurality of frame rates in SDH or SONET is accomplished with a single circuit. In JP 2008-227995 A, there is disclosed a multi-rate interface board in which low-rate signals that are not standardized by OTN frame standards are turned into an OTN frame irrespective of the signal type.

In recent years, the diversification of signals (protocols) coupled to a network, which reflects their different uses, has also been observed. The link layer, for instance, has a mixture of various protocols such as the Ethernet (trademark), Fibre Channel, and InfiniBand.

Against this background, there is an increasing demand in the field of networks where links having different transport data rates are multiplexed before transmitted for a signal multiplexing technology compatible with multiple rates which does not depend on a specific protocol or a specific transport data rate.

The technology disclosed in JP 2003-143097 A detects, on the premise that transported signals are in the formats of SDH and SONET which are networks using synchronization protocols that heavily rely on accurate and stable clocks, multiple rates by detecting synchronization detection patterns unique to the respective formats. This technology therefore cannot detect signals of, for example, the Ethernet which runs on asynchronous clocks.

While transport in the OTN format allows for mapping irrespective of the signal type, as well as integrated monitoring control of the overall network, implementing the technology requires putting in a plurality of transport apparatus in order to cover each OTN frame type standardized by the ITU in advance.

The technology disclosed in JP 2008-227995 A detects multiple rates with the use of an optical module code which is identification information indicating the type of an optical module. This technology is therefore not applicable to apparatus in which an optical module is not installed.

SUMMARY OF THE INVENTION

This invention relates to a data transport system and a data transport apparatus that have a plurality of physical ports including ones for multi-lane transport, that are capable of multiplexing data and transporting the multiplexed data, and that are required to transport data in a network where various link-layer protocols are used mixedly, and an object of this invention is to provide, in particular, a small-sized data transport apparatus with little delay which is capable of multiplexing and demultiplexing data without depending on a specific link-layer protocol or a specific transport lane count.

An aspect of the invention disclosed in this application is a transport system, comprising: a first transport apparatus for transporting data received by a plurality of first physical ports; and a second transport apparatus for receiving the data transported from the first transport apparatus and transmitting the received data from a plurality of second physical ports, wherein the first transport apparatus notifies, for each of the plurality of first physical ports, to the second transport apparatus, a valid first lane count indicating how many of a plurality of first lanes owned by the first physical port are valid, and identification information of the first physical port that owns the valid first lanes, and wherein the second transport apparatus is configured to: obtain, for each of the plurality of second physical ports, a valid second lane count indicating how many of a plurality of second lanes owned by the second physical port are valid, and identification information of the second physical port that owns the valid second lanes; associate, based on the valid second lane count and the identification information of the second physical port, and the valid first lane count and the identification information of the first physical port which are notified by the first transport apparatus, the identification information of the first physical port and the identification information of the second physical port; and transmit, when data including identification information of one of the plurality of first physical ports is transmitted from the first transport apparatus, the data from the second physical port that is identified by the identification information associated with the identification information of the one of the plurality of first physical ports which is included in the data.

According to the exemplary embodiment of this invention, data transport can be made efficient. Other objects, configurations, and effects than those described above become apparent from the following description of an embodiment of this invention.

BRIEF DESCRIPTION OF THE DRAWINGS

FIG. 5 is an explanatory diagram illustrating an example of an alignment marker that is inserted in data transported in the transport system.

DETAILED DESCRIPTION OF THE PREFERRED EMBODIMENTS

Figure 1:
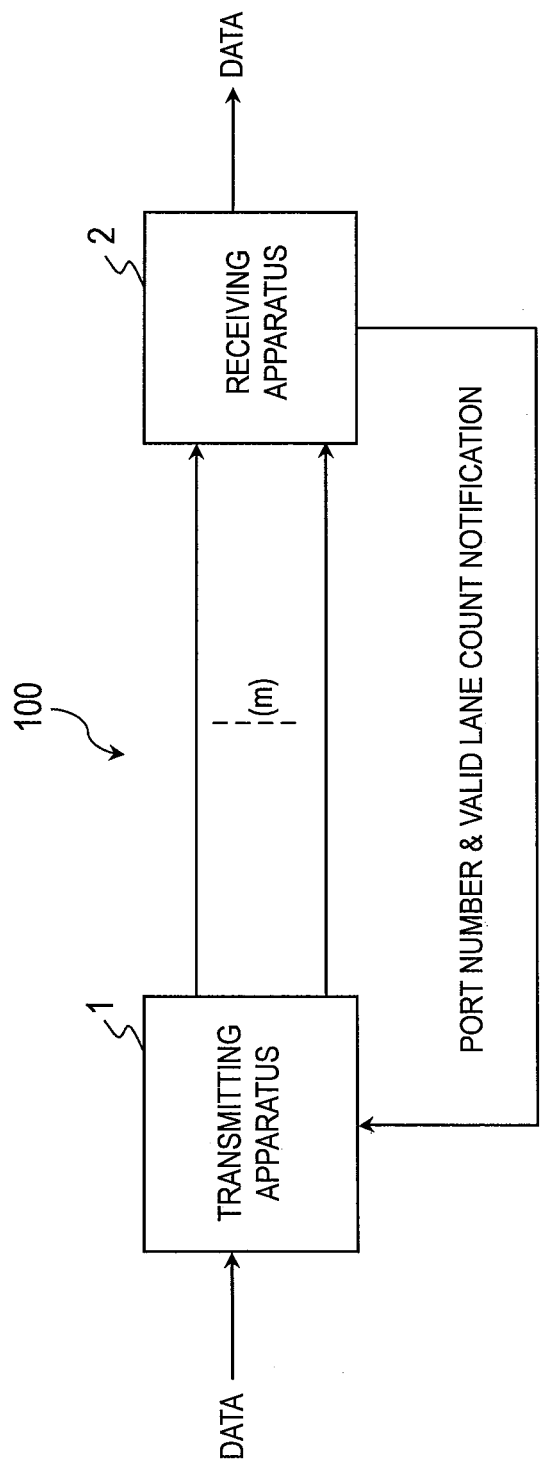
FIG. 1 is an explanatory diagram illustrating Configuration Example 1 of a transport system.

The following description of an embodiment of this invention is divided into a plurality of embodiments or a plurality of sections if necessary for convenience. However, unless explicitly noted otherwise, the embodiments or sections are not irrelevant to one another, and one is related to another as a modification example, detailed or supplementary description, or the like of a part of or the entirety of the other. When the count of pieces of a component or the like (including the count, numerical value, amount, and range of a component) is mentioned in the following description of an embodiment of this invention, this invention is not limited to the particular count mentioned and the component count can be higher or lower than the particular count, unless explicitly noted otherwise or unless it is theoretically obvious that the component count is limited to the particular count.

In the following description of an embodiment of this invention, a component (including a constituent step) is not always indispensable unless explicitly noted otherwise or unless it is theoretically obvious that the component is indispensable. Similarly, when the shapes, positional relations, and the like of components are mentioned in the following description of an embodiment of this invention, shapes and the like that are substantially approximate to or similar to the ones mentioned are included unless explicitly noted otherwise or unless it is theoretically obvious that it is not the case. The same applies to the numerical value and the range in the preceding paragraph.

In the following description of an embodiment of this invention, "transport lane" is a collective term for physical lanes, virtual lanes, Physical Coding Sublayer (PCS) lanes, and the like, and is not limited to physical transport paths.

A transport system, receiving apparatus, transmitting apparatus, and communication apparatus according to an embodiment of this invention in one example have a plurality of physical ports and transport data in a network where various link-layer protocols are used mixedly.

The communication apparatus is an apparatus that has both a transmission function of a transmitting apparatus for transmitting data and a reception function of a receiving apparatus for receiving data. A transport system is a system that includes one of a configuration for transporting data from a transmitting apparatus to a receiving apparatus, a configuration for transporting data from a transmitting apparatus to a communication apparatus, a configuration for transporting data from a communication apparatus to a receiving apparatus, and a configuration for transporting data from one communication apparatus to another communication apparatus. A transmitting apparatus and a communication apparatus may be configured so as to multiplex data and transmit the multiplexed data. A receiving apparatus and a communication apparatus may be configured so as to demultiplex multiplexed data. The collective term herein for a transmitting apparatus, a receiving apparatus, and a communication apparatus is "transport apparatus".

An embodiment of this invention is described in detail below with reference to the drawings. The same components are denoted by the same reference symbols throughout all drawings that illustrate the embodiment, and repetitive descriptions thereof are omitted.

<Configuration Example of a Transport System>

FIG. 1 is an explanatory diagram illustrating Configuration Example 1 of a transport system. The transport system of FIG. 1, which is denoted by 100, includes a transmitting apparatus 1 and a receiving apparatus 2, and data is transported from the transmitting apparatus 1 to the receiving apparatus 2. The transmitting apparatus 1 and the receiving apparatus 2 are connected to each other via a transport path which is constructed of m transport lanes. A port number and a valid lane count may be notified with the use of a path that is provided separately, or may be notified with the use of the m transport lanes. The variable m indicates the total lane count of the transport path, and represents an integer equal to or larger than 1. The valid lane count is the count of lanes along which valid data is transported.

Figure 2:
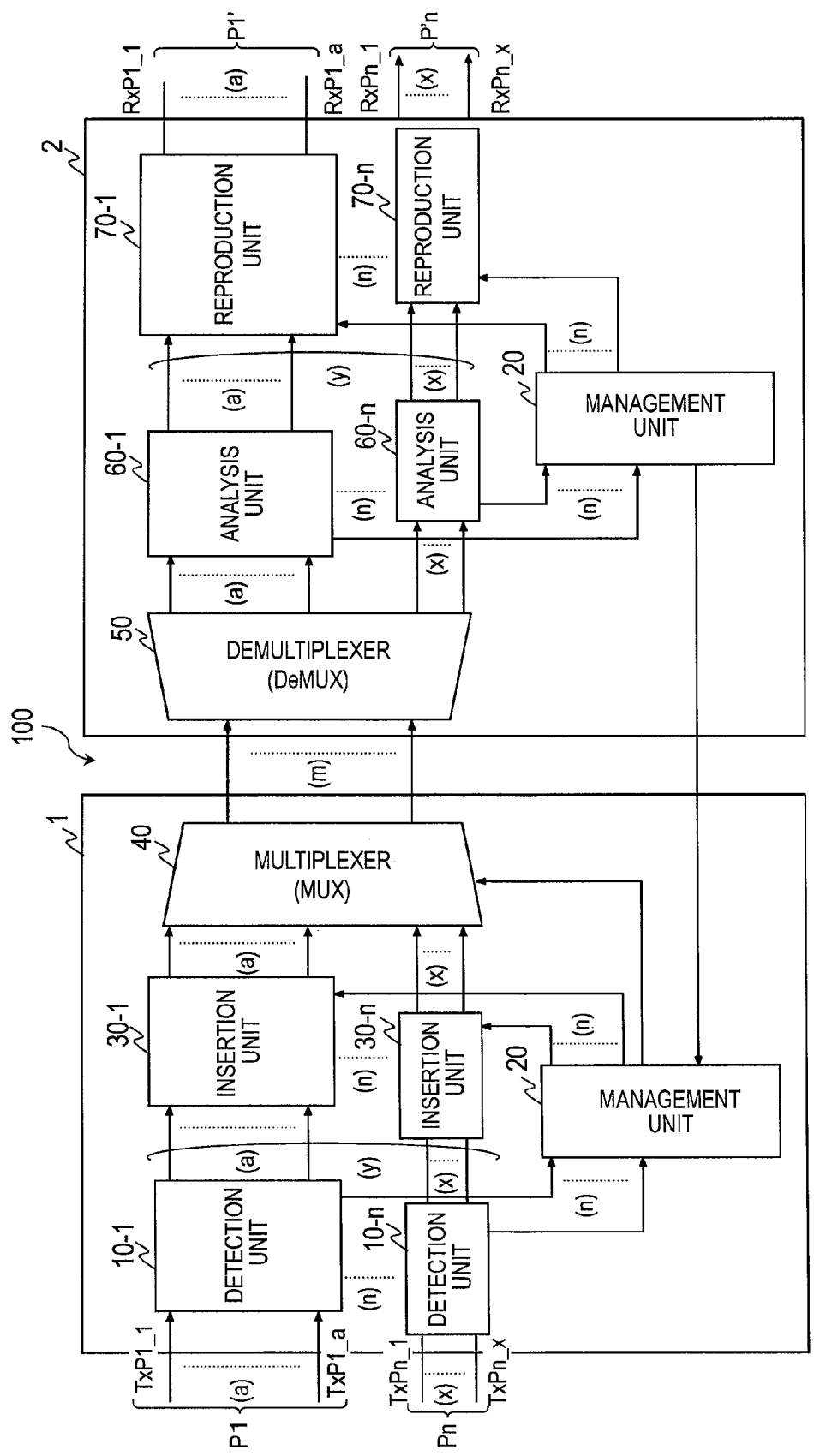
FIG. 2 is a block diagram illustrating the internal configurations of the transmitting apparatus and the receiving apparatus in the transport system of FIG. 1.

FIG. 2 is a block diagram illustrating the internal configurations of the transmitting apparatus and the receiving apparatus in the transport system 100 of FIG. 1. The transmitting apparatus 1 includes n detection units 10 (10-1 to 10-$n$), a management unit 20, n insertion units 30 (30-1 to 30-$n$), and a multiplexer 40. The variable n indicates the count of physical ports and represents an integer equal to or larger than 1.

The n detection units 10 (10-1 to 10-$n$) are connected to physical ports P1 to Pn, respectively. The physical ports P1 to Pn each accommodate transport lanes. For example, the physical port P1 accommodates a transport lanes TxP1_1 to TxP1_a, and the physical port Pn accommodates x transport lanes TxPn_1 to TxPn_x. The variables a and x are each an integer equal to or larger than 1.

The n detection units 10 (10-1 to 10-$n$) each detect the port number of a physical port connected to a transport line and which transport lane of this physical port is valid. A valid lane is a transport lane at which valid data arrives from a transport line when the transport line is connected to one of the physical ports P1 to Pn. The n detection units 10 (10-1 to 10-$n$) respectively transport bit strings of data transported along valid lanes to their associated insertion units 30 (30-1 to 30-*n*). The detection units 10 may perform the detection when the transmitting apparatus 1 is powered on or when a physical port is connected.

The management unit 20 in the transmitting apparatus 1 receives port numbers and valid lane counts from the n detection units 10 (10-1 to 10-*n*) and transmits the received numbers and counts to their associated insertion units 30 (30-1 to 30-*n*). The management unit 20 in the transmitting apparatus 1 also notifies a port number to the multiplexer 40.

The n insertion units 30 (30-1 to 30-*n*) each insert a port number and a valid lane count from the management unit 20 into data that has been transported from its associated detection unit. The n insertion units 30 (30-1 to 30-*n*) each transport a bit string of the data in which the port number is inserted to the multiplexer 40.

The multiplexer 40 uses a port number notified from the management unit 20 as a selection signal, and receives and multiplexes data transported from the n insertion units 30 (30-1 to 30-*n*). The multiplexer 40 transmits the multiplexed data to the transport path constructed of m transport lanes.

The receiving apparatus 2 includes a demultiplexer 50, n analysis units 60 (60-1 to 60-*n*), n reproduction units 70 (70-1 to 70-*n*), and the management unit 20.

The demultiplexer 50 demultiplexes multiplexed data from the transmitting apparatus 1. The demultiplexer 50 transports a bit string of the demultiplexed data to an analysis unit that is associated with a port number included in the data.

The n analysis units 60 (60-1 to 60-*n*) each take a port number out of data from the demultiplexer 50 and notifies the port number to the management unit 20 of the receiving apparatus 2. The n analysis units 60 (60-1 to 60-*n*) each also transport a bit string of the data from the demultiplexer 50 to its associated reproduction unit 70.

The n reproduction units 70 (70-1 to 70-*n*) are connected to physical ports P1' to Pn', respectively. The physical ports P1' to Pn' each accommodate transport lanes. For example, the physical port P1' accommodates a transport lanes RxP1_1 to RxP1_a similarly to the physical port P1, and the physical port Pn' accommodates x transport lanes RxPn_1 to RxPn_x similarly to the physical port Pn.

The management unit 20 of the receiving apparatus 2 notifies, along with valid lane counts, port numbers that have been notified from the n analysis units 60 (60-1 to 60-*n*) to their associated reproduction units 70.

The n reproduction units 70 (70-1 to 70-*n*) are each notified of a port number and a valid lane count by the management unit 20 of the receiving apparatus 2, and allocate a bit string of data transmitted from its associated analysis unit 60 to a transport lane of the physical port connected to a transport line in order to transport the bit string along the transport lane.

The management unit 20 of the receiving apparatus 2 counts, as a valid lane, for each of the physical ports P1' to Pn', a transport lane of the physical port along which a bit string of data is transported, and notifies valid lane counts which are the counts of the thus counted valid lanes and port numbers notified from the n analysis units 60 (60-1 to 60-*n*) to the management unit 20 of the transmitting apparatus 1.

Figure 3:
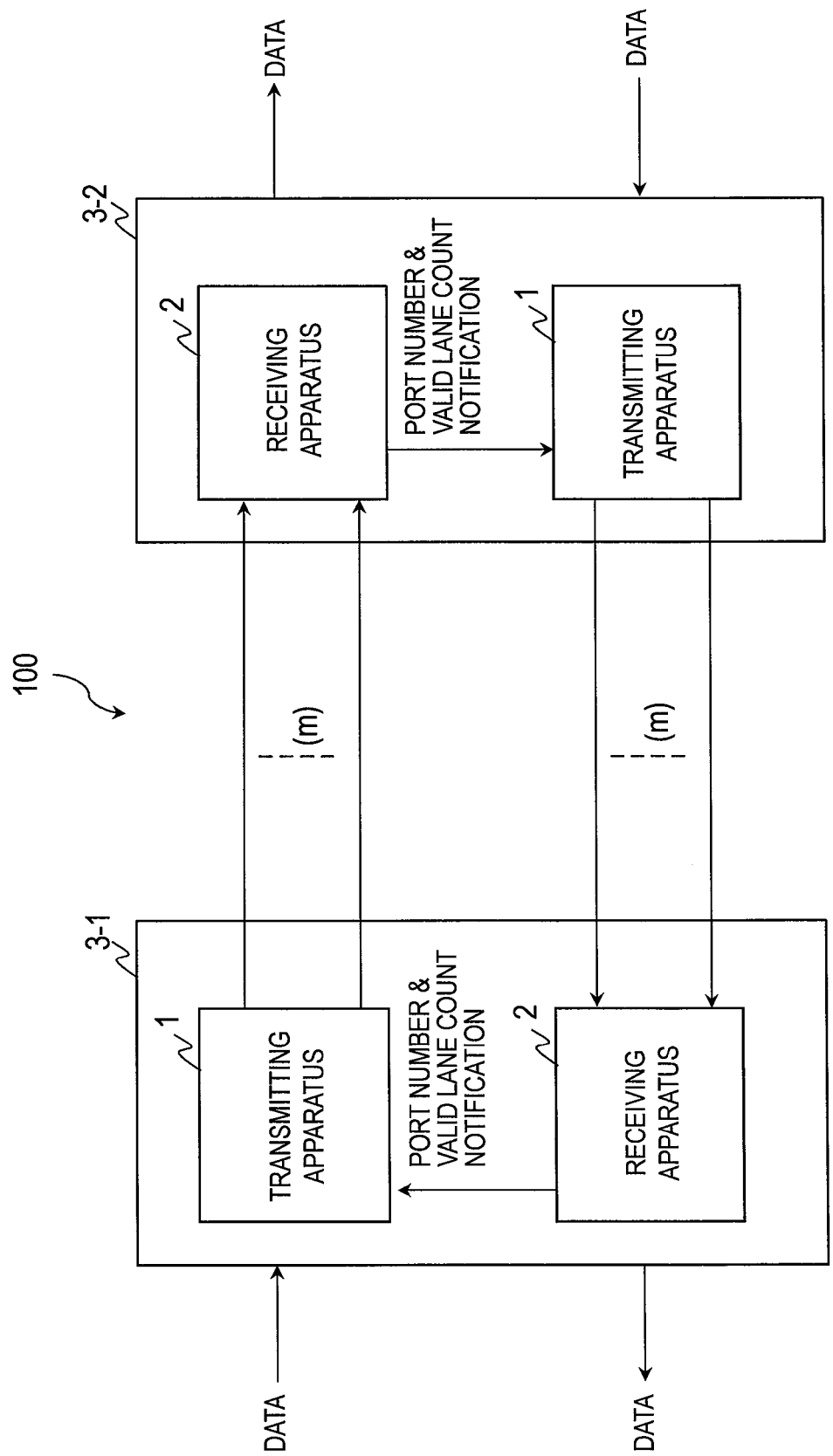
FIG. 3 is an explanatory diagram illustrating Configuration Example 2 of the transport system.

FIG. 3 is an explanatory diagram illustrating Configuration Example 2 of the transport system 100. The transport system 100 of FIG. 3 includes two communication apparatus, and data is transported from one of the communication apparatus that is denoted by 3-1 to the other communication apparatus denoted by 3-2. The communication apparatus 3-1 and the communication apparatus 3-2 each include the transmitting apparatus 1 and receiving apparatus 2 of FIG. 1. The transmitting apparatus 1 and the receiving apparatus 2 in each of the communication apparatus 3-1 and 3-2 share a management unit. The transmitting apparatus 1 in the communication apparatus 3-1 is connected to the receiving apparatus 2 in the communication apparatus 3-2, and the transmitting apparatus 1 in the communication apparatus 3-2 is connected to the receiving apparatus 2 in the communication apparatus 3-1.

Figure 4:
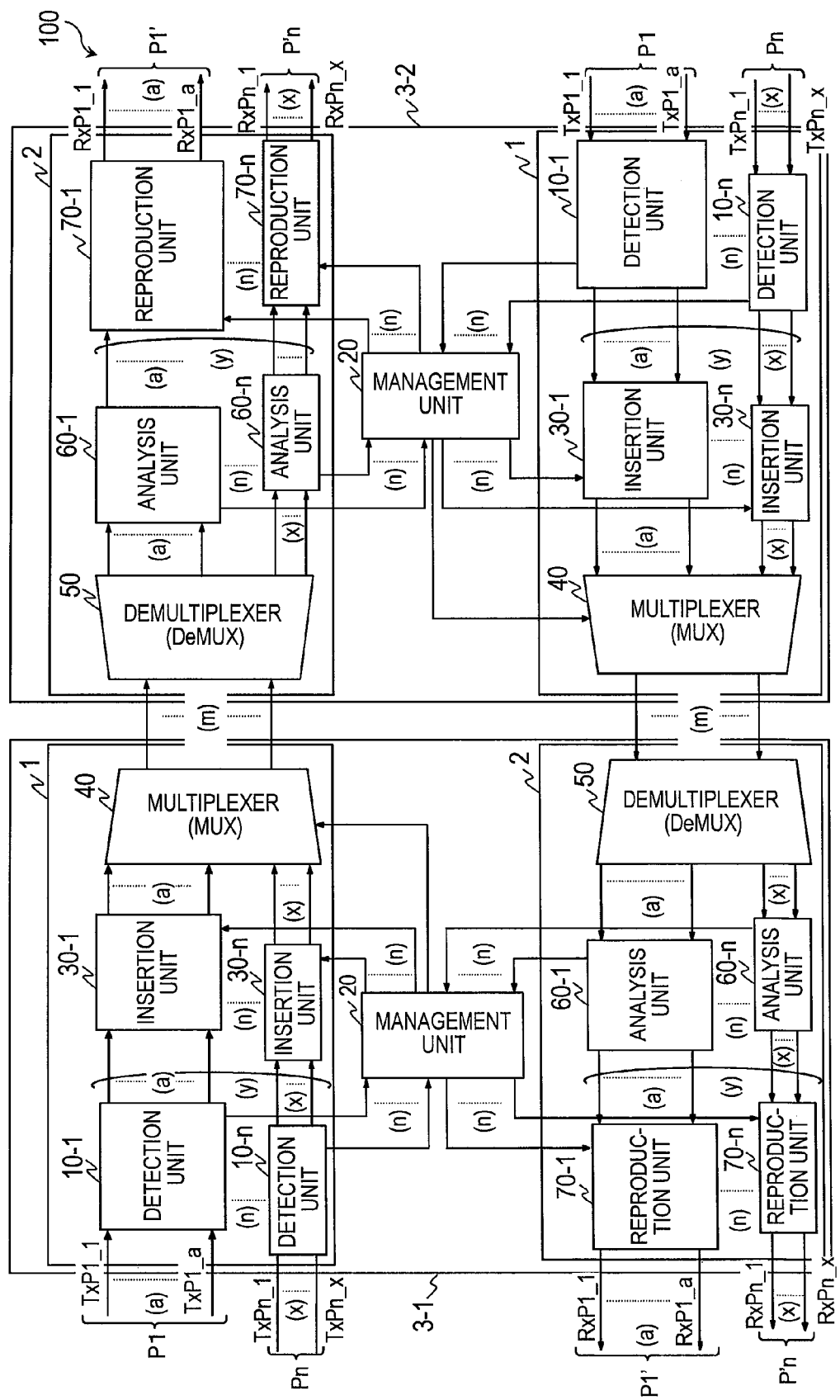
FIG. 4 is a block diagram illustrating the internal configurations of the communication apparatus 3-1 and 3-2 in the transport system of FIG. 3.

FIG. 4 is a block diagram illustrating the internal configurations of the communication apparatus 3-1 and 3-2 in the transport system 100 of FIG. 3. The relation between the transmitting apparatus 1 in the communication apparatus 3-1 and the receiving apparatus 2 in the communication apparatus 3-2 is the same as in FIG. 2. The relation between the transmitting apparatus 1 in the communication apparatus 3-1 and the receiving apparatus 2 in the communication apparatus 3-2, too, is the same as in FIG. 2.

<Data Structure Example>

FIG. 5 is an explanatory diagram illustrating an example of an alignment marker that is inserted in data transported in the transport system 100. The alignment marker of 100G Ethernet is used here. The alignment marker includes a header, a marker M0, a marker M1, a marker M2, bit parity BIP3, a marker M4, a marker M5, a marker M6, and bit parity BIP7. Information to be transported is also included.

The marker M0 is information that links a port number of a physical port to a local transmission/remote dealing identifier. A "local" means its own apparatus, and a "remote" is a transport apparatus at the other end of the transport. For instance, to the transmitting apparatus 1 of FIG. 1, the transmitting apparatus 1 is a local and the receiving apparatus 2 is a remote. Similarly, to the receiving apparatus 2, the receiving apparatus 2 is a local and the transmitting apparatus 1 is a remote. The local transmission/remote dealing identifier of data is an identifier for identifying whether the data is "local transmission" or "remote dealing". A local transmission identifier is an identifier that is assigned in the case where a local transports a port number detected by the local to a remote. A remote dealing identifier is an identifier that is assigned in the case where a local updates a port number transported from the local and returns the updated port number to a remote.

The marker M1 is information that links the valid lane count of a physical port whose port number has been detected by a local to a master/slave identifier. A master/slave identifier is an identifier for identifying whether its own apparatus is a master or a slave. Whether its own apparatus is a master or a slave is set in advance. The master/slave identifier is referred to when there is a conflict between physical ports.

The marker M2 is information that links the physical port number of a remote to an update OK/NG identifier. An update OK/NG identifier is an identifier for identifying whether or not a port number and a valid lane count have been established in a local, and "update OK" is assigned in the case where a port number and a valid lane count have been established, whereas "update NG" is assigned in the case where a port number and a valid lane count have not been established.

The bit parity BIP3 is the bit parity value of data. The marker M4 is a value obtained by the bit-wise inversion of the marker M0. The marker M5 is a value obtained by the bit-wise inversion of the marker M1. The marker M6 is a value obtained by the bit-wise inversion of the marker M2. The bit parity BIP7 is a value obtained by the bit-wise inversion of the bit parity BIP3.

<Date Transport Sequence>

Figure 6:
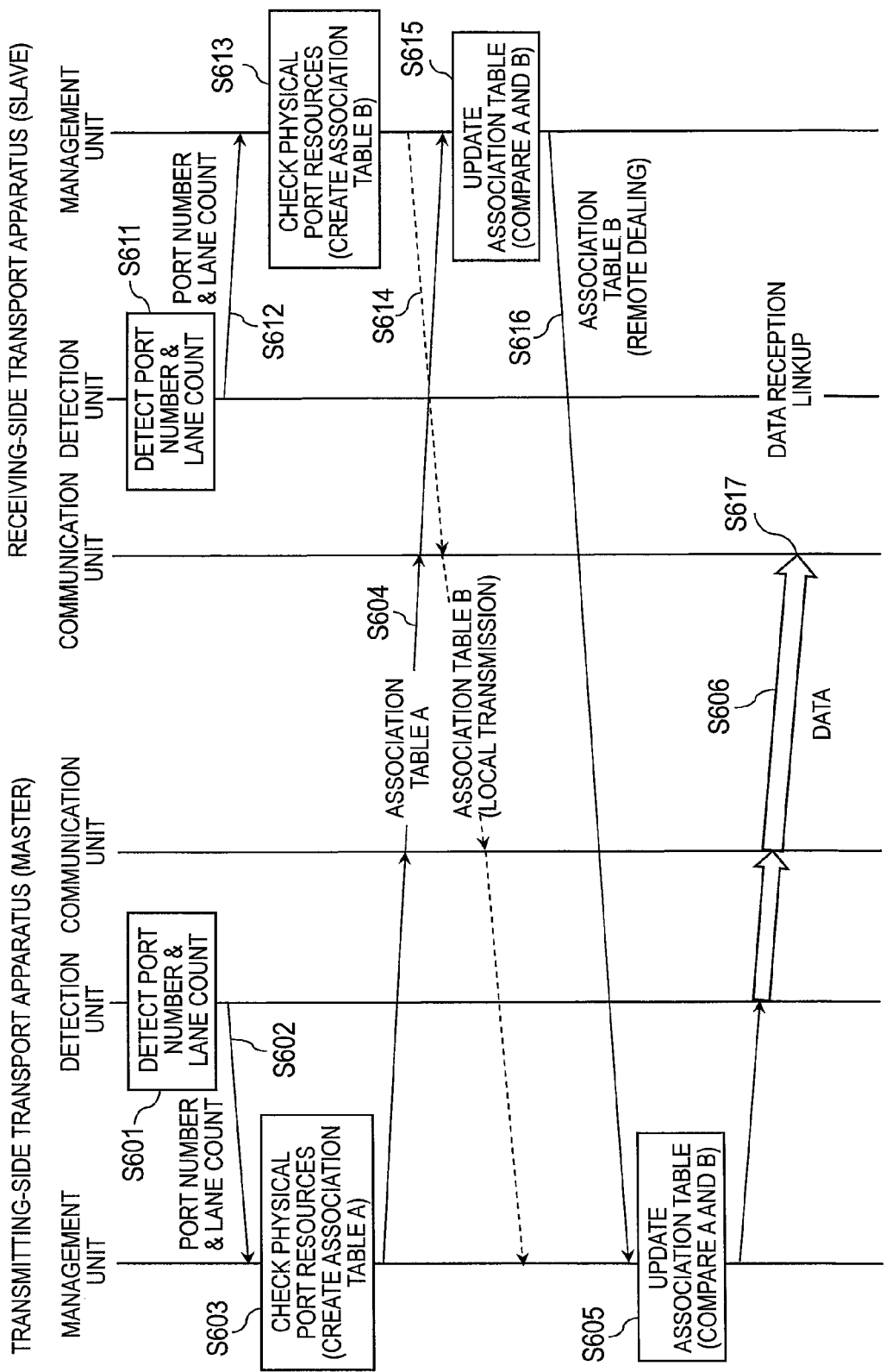
FIG. 6 is a sequence diagram illustrating a transport example in the transport system.

FIG. 6 is a sequence diagram illustrating a transport example in the transport system 100. In the description of FIG. 6, the transport apparatus on the left is the master and the transport apparatus on the right is the slave. Pairs of a port number and a valid lane count are referred to as "association table" in FIG. 6, and the management unit 20 in one transport apparatus and the management unit 20 in the other transport apparatus notifies their association tables to each other.

In FIG. 6, "communication unit" is a collective term for transmitting units and receiving units. A "transmitting unit" includes the plurality of insertion units 30-1 to 30-n and the multiplexer 40 which are illustrated in FIGS. 2 and 4. In the case where the multiplexer 40 is unnecessary, a "transmitting unit" equals the plurality of insertion units 30-1 to 30-n. Similarly, a "receiving unit" includes the plurality of analysis units 60-1 to 60-n and the demultiplexer 50 which are illustrated in FIGS. 2 and 4. In the case where the demultiplexer 50 is unnecessary, a "receiving unit" equals the plurality of n analysis units 60-1 to 60-n.

The master detects a port number and a valid lane count through one of the detection units 10 (Step S601), and notifies the detected port number and valid lane count to the management unit 20 (Step S602). The master uses the management unit 20 to check resources of a physical port in question and to create an association table A, which includes the detected port number and valid lane count (Step S603). In this step, the master uses the relevant insertion unit 30 to set the local transmission identifier in the marker M0, set the master identifier in the marker M1, and set the update NG identifier which is a default value in the marker M2 in the association table A. The master then uses the communication unit to transmit the association table A to the slave (Step S604).

Similarly, the slave detects a port number and a valid lane count through one of the detection units 10 (Step S611), and notifies the detected port number and valid lane count to the management unit 20 (Step S612). The slave uses the management unit 20 to check resources of a physical port in question and to create an association table B, which includes the detected port number and valid lane count (Step S613). In this step, the slave uses the relevant insertion unit 30 to set the local transmission identifier in the marker M0, the slave identifier in the marker M1, and set the update NG identifier which is a default value in the marker M2 in the association table B. The slave then uses the communication unit to transmit the association table B to the master (Step S614).

The slave compares the association table B with the association table A transmitted from the master, and updates the association table B (Step S615). The local transmission identifier is set in the association table A transmitted from the master, and is used in the slave for an update of the association table B. In the updated association table B, the marker M0 is changed to the remote dealing identifier. The slave uses the management unit 20 to notify the updated association table B to the master (Step S616).

The master receives the association table B transmitted in Step S614 and the updated association table B notified in Step S616. The master does not use the association table B transmitted in Step S614 which has the local transmission identifier set therein for comparison with the association table A. The master compares the association table A with the updated association table B notified in Step S614 which has the remote dealing identifier set therein, to thereby update the association table A (Step S605).

In the case where the association table A is established by the update, the master changes the marker M2 to "update OK" and transmits data from the communication unit to the remote (Step S606). The slave receives the data, thereby linking up for data reception (Step S607). This completes the sequence.

<Association Table Update Example>

Figure 7:
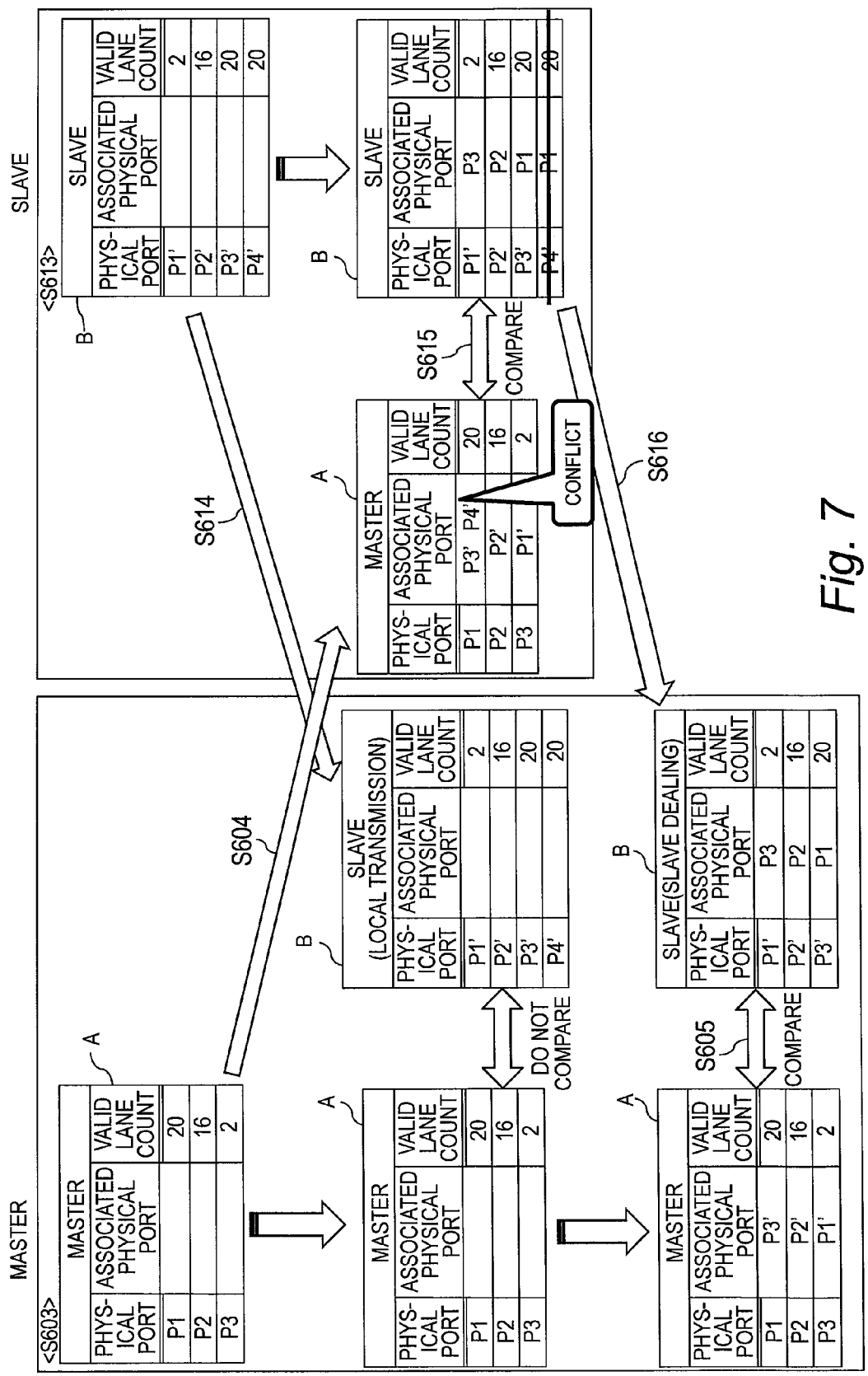
FIG. 7 is an explanatory diagram illustrating Update Example 1 of association tables.

FIG. 7 is an explanatory diagram illustrating Update Example 1 of association tables. The description given here refers to the sequence of FIG. 6. The master creates the association table A (Step S603), and transmits the association table A to the slave (Step S604). The local transmission/remote dealing identifier set in the created table is "local transmission". The association table A here has port numbers P1 to P3 and valid lane counts 20, 16, and 2 of the ports.

The slave creates the association table B (Step S613), and transmits the association table B to the master (Step S614). The local transmission/remote dealing identifier set in the created table is "local transmission". The association table B here has port numbers P1' to P4' and valid lane counts 2, 16, 20, and 20 of the ports.

The master receives the association table B in Step S614 but does not compare the association table B, in which the local transmission identifier is set, with the association table A. This is because the association table B has not been updated in the slave based on the association table A, and there is accordingly a chance of conflict, which is described later.

The slave compares the association table A and the association table B in Step S615, and updates the association table B. In the comparison between the association tables A and B, port numbers that have the same valid lane count are associated with each other. Accordingly, in the association table A, the port number P1 is associated with the port numbers P3' and P4', the port number P2 is associated with the port number P2', and the port number P3 is associated with the port number P1'. In the association table B, the port number P1' is associated with the port number P3, the port number P2' is associated with the port number P2, the port number P3' is associated with the port number P1, and the port number P4' is associated with the port number P1.

In the association table A, where the port number P1 is associated with the port numbers P3' and P4', one port is associated with a plurality of ports, thereby creating a conflict. In order to solve the conflict, the slave updates the association table B by deleting an entry for the port number P4' from the association table B. The slave notifies the updated association table B to the master (Step S616).

Receiving the updated association table B notified in Step S616, the master compares the updated association table B with the association table A and updates the association table A (Step S605). In the comparison between the association tables A and B, port numbers that have the same valid lane count are associated with each other as in the description given above. Accordingly, in the association table A, the port number P1 is associated with the port number P3', the port number P2 is associated with the port number P2', and the port number P3 is associated with the port number P1'. This establishes the association table A of the master, which means that the master is ready for data transport to the slave.

Figure 8:
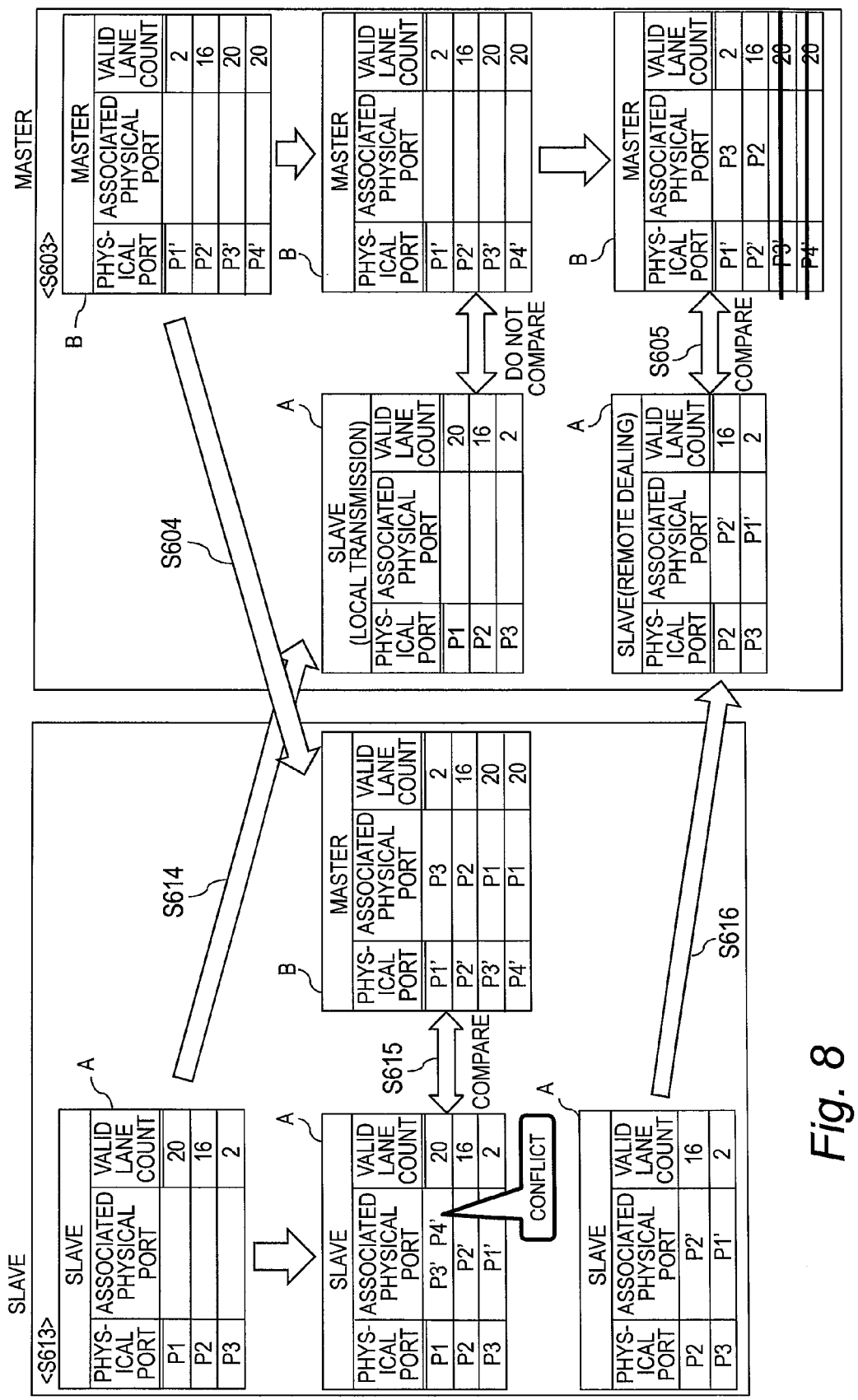
FIG. 8 is another explanatory diagram illustrating Update Example 1 of association tables.

FIG. 8 is another explanatory diagram illustrating Update Example 1 of association tables. The difference from FIG. 7 is that, opposite to FIG. 7 where the transport apparatus on the left is the master and the transport apparatus on the right is the slave, the master in FIG. 8 is the transport apparatus on the right, with the transport apparatus on the left serving as the slave. The association tables A and B in FIG. 8 are the same as the ones in FIG. 7.

The master creates the association table B (Step S603), and transmits the association table B to the slave (Step S604). The local transmission/remote dealing identifier set in the created table is "local transmission". The association table B here has port numbers P1' to P4' and valid lane counts 2, 16, 20, and 20 of the ports.

The slave creates the association table A (Step S613), and transmits the association table A to the master (Step S614). The local transmission/remote dealing identifier set in the created table is "local transmission". The association table A here has port numbers P1 to P3 and valid lane counts 20, 16, and 2 of the ports.

The master receives the association table A in Step S614 but does not compare the association table A, in which the local transmission identifier is set, with the association table B.

The slave compares the association table A and the association table B in Step S615, and updates the association table A. In the comparison between the association tables A and B, port numbers that have the same valid lane count are associated with each other. Accordingly, in the association table A, the port number P1 is associated with the port numbers P3' and P4', the port number P2 is associated with the port number P2', and the port number P3 is associated with the port number P1'. In the association table B, the port number P1' is associated with the port number P3, the port number P2' is associated with the port number P2, the port number P3' is associated with the port number P1, and the port number P4' is associated with the port number P1.

In the association table A, where the port number P1 is associated with the port numbers P3' and P4', one port is associated with a plurality of ports, thereby creating a conflict. In order to solve the conflict, the slave updates the association table A by deleting an entry for the port number P1 from the association table A. The slave notifies the updated association table A to the master (Step S616).

Receiving the updated association table A notified in Step S616, the master compares the updated association table A with the association table B and updates the association table B (Step S605). In the comparison between the association tables A and B, port numbers that have the same valid lane count are associated with each other as in the description given above. Accordingly, in the association table B, the port number P1' is associated with the port number P3 and the port number P2' is associated with the port number P2. Port numbers that are associated with the port numbers P3' and P4' are not in the association table A, and the master therefore deletes entries for the port numbers P3' and P4' from the association table B. This establishes the association table B of the master, which means that the master is ready for data transport to the slave.

<Examples of a Data Transport Processing Procedure>

Figure 9:
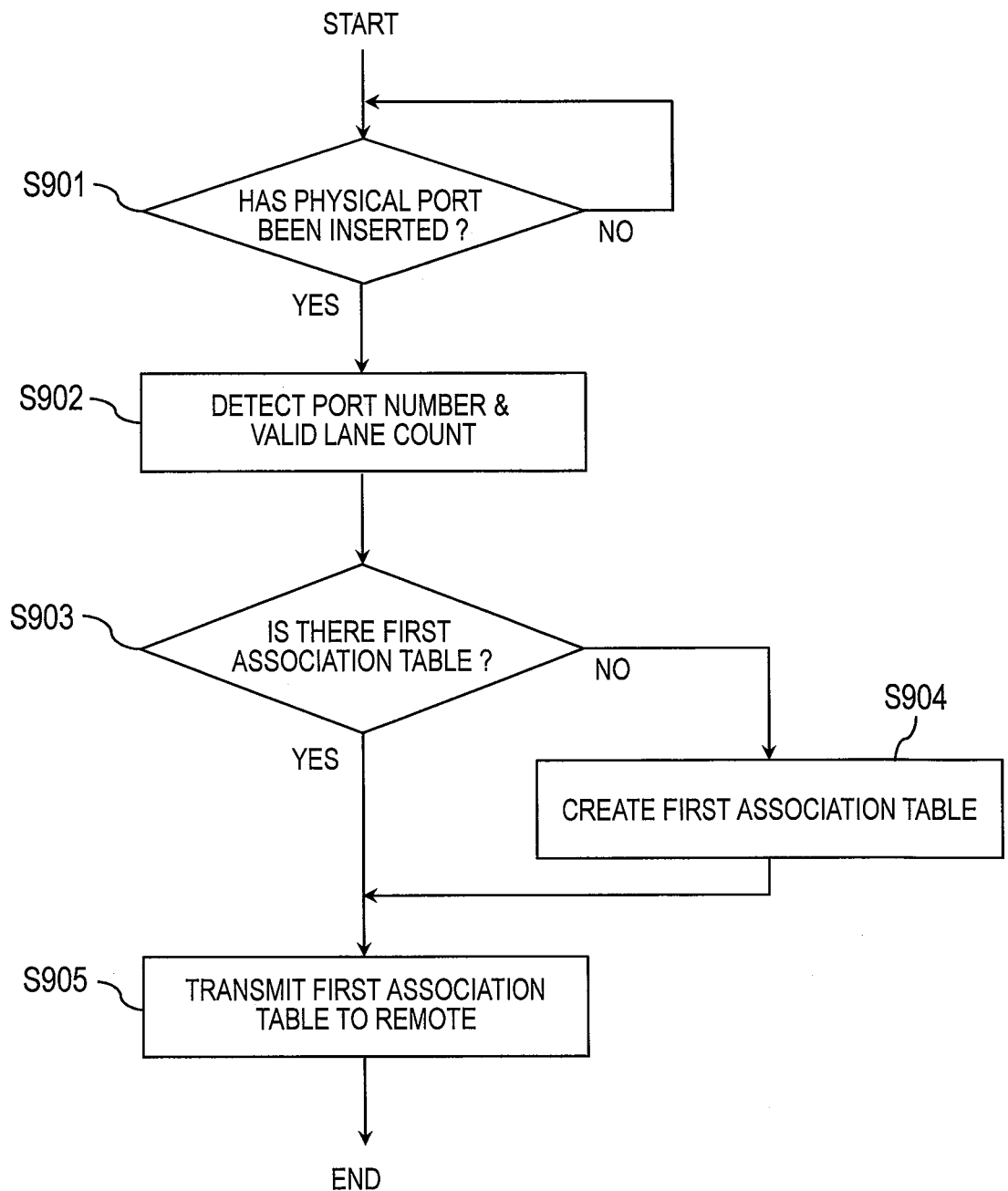
FIG. 9 is Flow Chart 1 illustrating an example of a data transport processing procedure in one of the transport apparatus.
Figure 10:
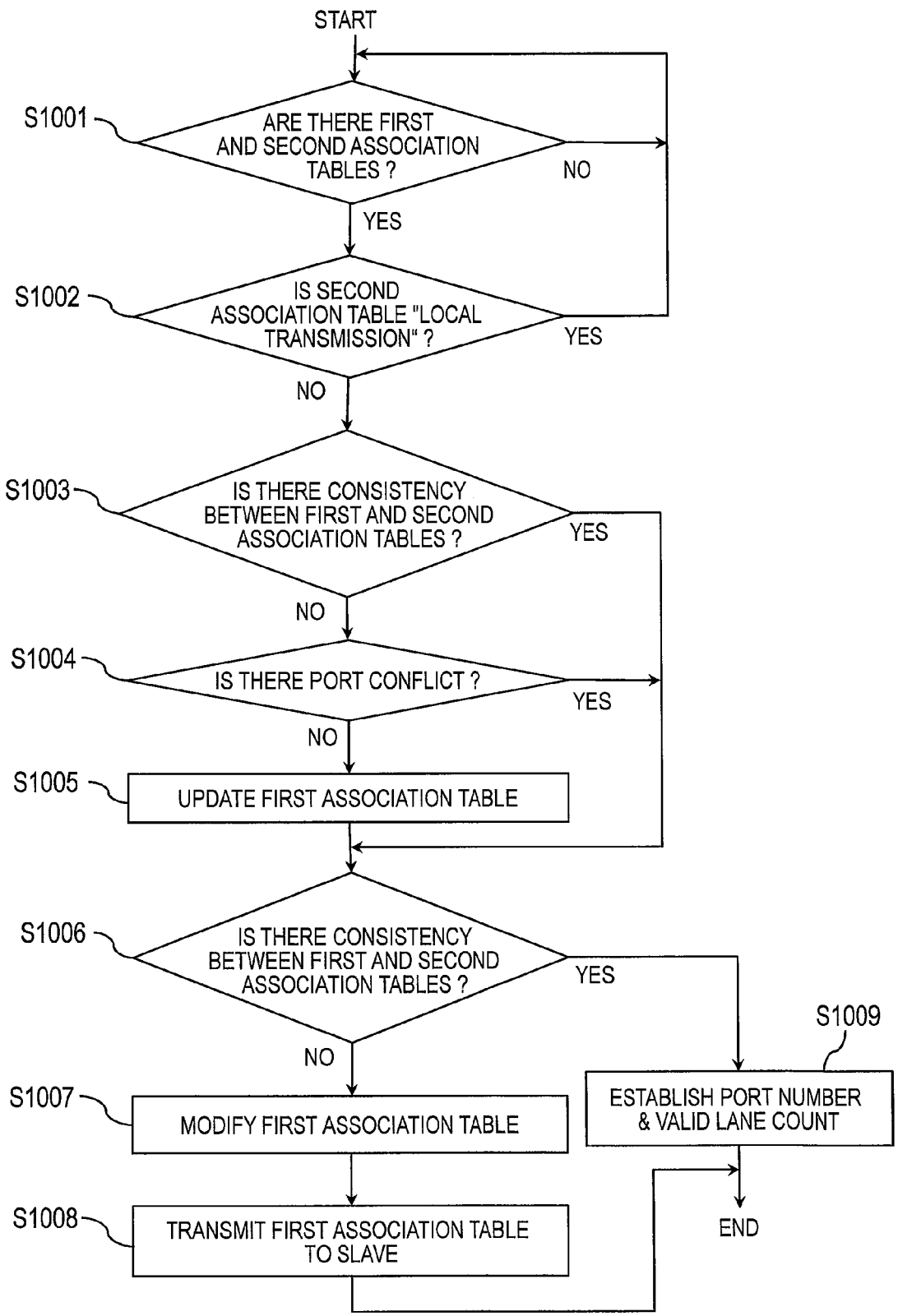
FIG. 10 is a flow chart illustrating an example of a data transport processing procedure in one of the transport apparatus that is a master.
Figure 11:
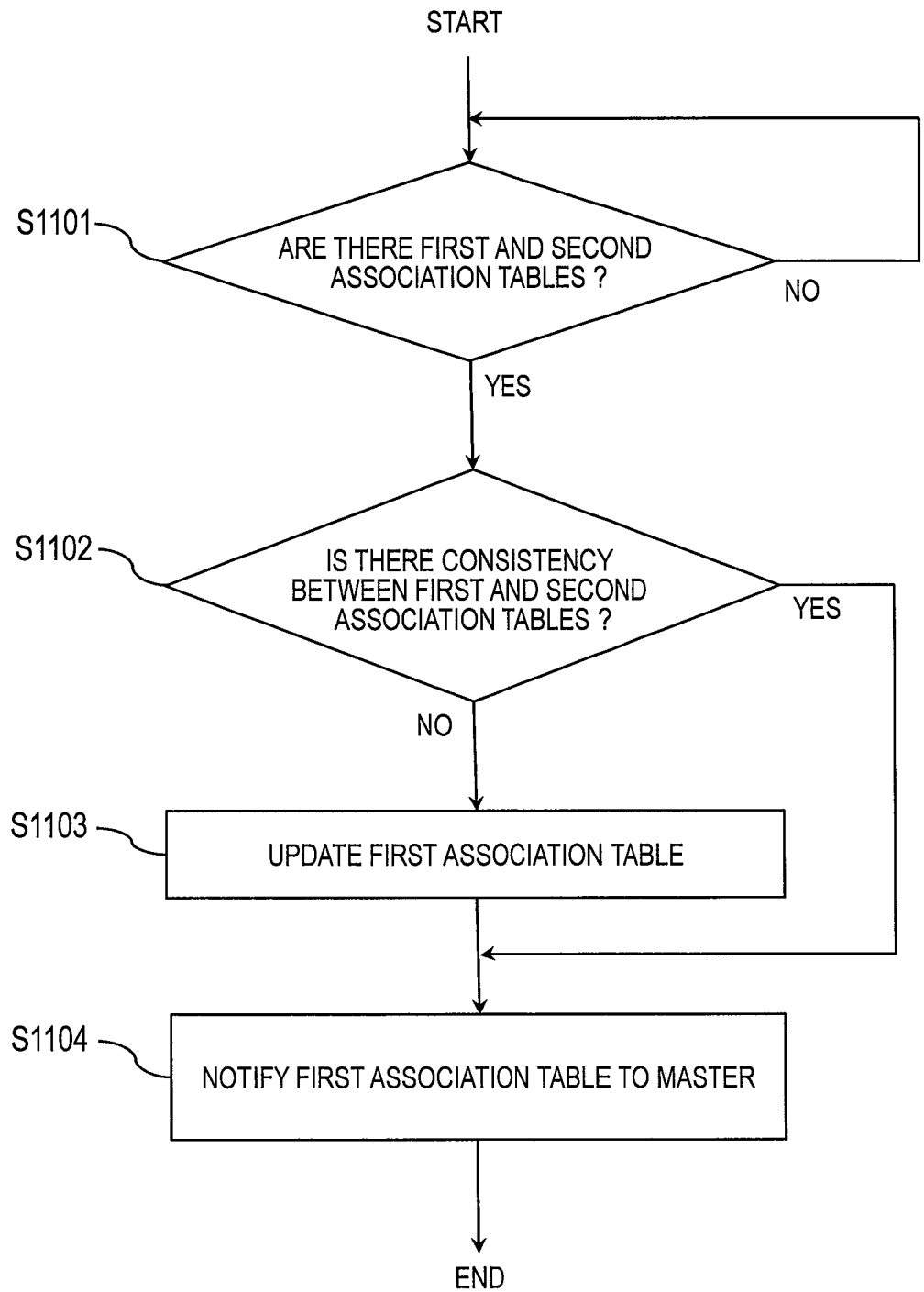
FIG. 11 is a flow chart illustrating an example of a data transport processing procedure in one of the transport apparatus that is a slave.

Examples of a data transport processing procedure in the transport system 100 are described next with reference to FIGS. 9 to 11. A flow chart of FIG. 9 is an example of a processing procedure that is executed regularly or when an execution instruction is received, irrespective of whether the own apparatus is a master or a slave. A flow chart of FIG. 10 is an example of a processing procedure that is executed when the own apparatus is a master. A flow chart of FIG. 11 is an example of a processing procedure that is executed when the own apparatus is a slave.

FIG. 9 is Flow Chart illustrating an example of a data transport processing procedure in one of the transport apparatus. The transport apparatus waits for the insertion of a communication module, which is connected to a transport line, into a physical port (Step S901: No) and, when a communication module is inserted (Step S901: Yes), detects a port number and a valid lane count through the relevant detecting unit 10 (Step S902).

The transport apparatus next determines whether or not a first association table is found in storage of its own apparatus (Step S903) and, when the first association table is found (Step S903: Yes), moves to Step S905. When the first association table is not found (Step S903: No), the transport apparatus uses the information detected in Step S902 to create the first association table (Step S904), and then moves to Step S905. The first association table is an association table that is created by its own apparatus. Accordingly, in the case of FIG. 7, the first association table is the association table A when the transport apparatus that is executing the processing procedure is the master, and the first association table is the association table B when the transport apparatus that is executing the processing procedure is the slave. The transport apparatus then transmits the first association table to the other transport apparatus which is the remote (Step S905).

FIG. 10 is a flow chart illustrating an example of a data transport processing procedure in one of the transport apparatus that is a master. The master transport apparatus first determines whether or not there are the first association table and a second association table (Step S1001). The second association table is an association table that is notified from the other transport apparatus which is the remote (the slave, in this case). For example, in the case of the master of FIG. 7, the master creates the association table A which is the first association table, and receives the association table B which is the second association table created and notified by the slave.

When there are the first association table and the second association table (Step S1001: Yes), the master determines whether or not the second association table has the local transmission identifier (Step S1002). When the second association table has the local transmission identifier (Step S1002: Yes), this second association table cannot be used in a comparison with the first association table, and the master therefore returns to Step S1001. When the second association table has the remote dealing identifier (Step S1002: No), on the other hand, the master moves to Step S1003.

In the example of FIG. 7, the association table B (the second association table) notified by the slave in Step S614 has the local transmission identifier set in the marker M0, and therefore is not compared with the association table A (the first association table).

The master next determines whether or not the association between the first association table and the second association table is consistent (Step S1003). In other words, the master determines whether or not physical ports of the master and physical ports of the slave can be associated with each other on a one-to-one basis when the valid lane count is the same in a master physical port and a slave physical port (Step S1003). The master moves to Step S1006 when the association is consistent (Step S1003: Yes), and to Step S1004 when the association is not consistent (Step S1003: No). For example, the comparison in Step S605 of FIG. 7 reveals that the association table A and the association table B are consistent with each other.

When the association is not consistent (Step S1003: No), the master determines whether or not there is a conflict between ports (Step S1004). When there is a conflict between ports (Step S1004: Yes), the master moves to Step S1006. When there is no conflict between ports (Step S1004: No), on the other hand, the master updates the first association table as illustrated in Step S605 of FIGS. 7 and 8 (Step S1005). In the example of FIG. 7, the master writes port numbers of the slave in a column for an associated physical port (corresponding to the marker M2 of FIG. 5) in the association table A.

Thereafter, the master again determines whether or not the association between the first association table and the second association table is consistent (Step S1006). The master modifies the first association table automatically or through a user's operation (Step S1007) when the association is not consistent (Step S1006: No). In the case of automatic modification, the master deletes the last entry in the first association table, for example. The master transmits the modified first association table to the slave (Step S1009). After the modification, the first association table is written over in the storage inside the master.

When it is determined in Step S1006 that the association is consistent (Step S1006: Yes), on the other hand, the master establishes port numbers and valid lane counts in the first association table (Step S1009). This enables the master to transport data to the slave with the use of a valid lane of an established physical port.

FIG. 11 is a flow chart illustrating an example of a data transport processing procedure in one of the transport apparatus that is a slave. The slave transport apparatus first determines whether or not there are the first association table and a second association table (Step S1101). The second association table is an association table that is notified from the other transport apparatus which is the remote (the master, in this case). For example, in the case of the slave of FIG. 7, the slave creates the association table B which is the first association table, and receives the association table A which is the second association table created and notified by the master.

When there are the first association table and the second association table (Step S1101: Yes), the slave determines whether or not the association between the first association table and the second association table is consistent (Step S1102). In other words, the slave determines whether or not physical ports of the slave and physical ports of the master can be associated with each other on a one-to-one basis when the valid lane count is the same in a master physical port and a slave physical port. The slave moves to Step S1104 when the association is consistent (Step S1102: Yes), and to Step S1103 when the association is not consistent (Step S1102: No). For example, the comparison in Step S615 of FIG. 7 reveals that the association table A and the association table B are not consistent with each other, and that there is also a conflict.

When the association is not consistent (Step S1102: No), the slave updates the first association table as illustrated in Step S615 of FIGS. 7 and 8 (Step S1103). In the case where there is a conflict, too, the slave solves the conflict through Step S1103. Then, the remote dealing identifier is set in the marker M0 of data in the first association table.

Thereafter, the slave notifies the first association table to the master (Step S1104). The notification corresponds to Step S616 of FIGS. 6 to 8.

<Application Examples of the Multiplexer and the Demultiplexer>

Figure 12:
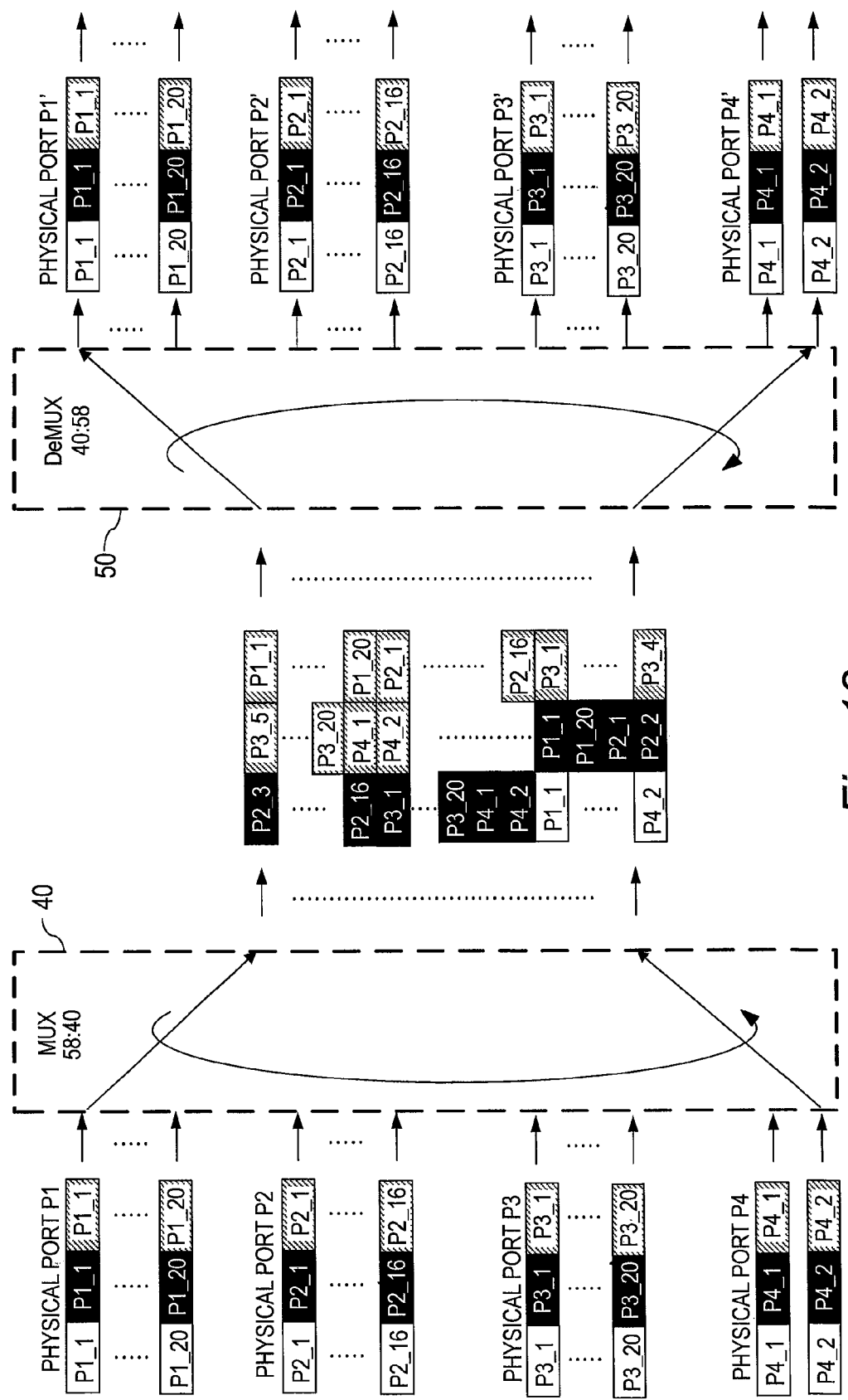
FIG. 12 is explanatory diagram 1 illustrating transport example in the transport system in which the multiplexer is installed in the transmitting-side transport apparatus and the demultiplexer is installed in the receiving-side transport apparatus.
Figure 13:
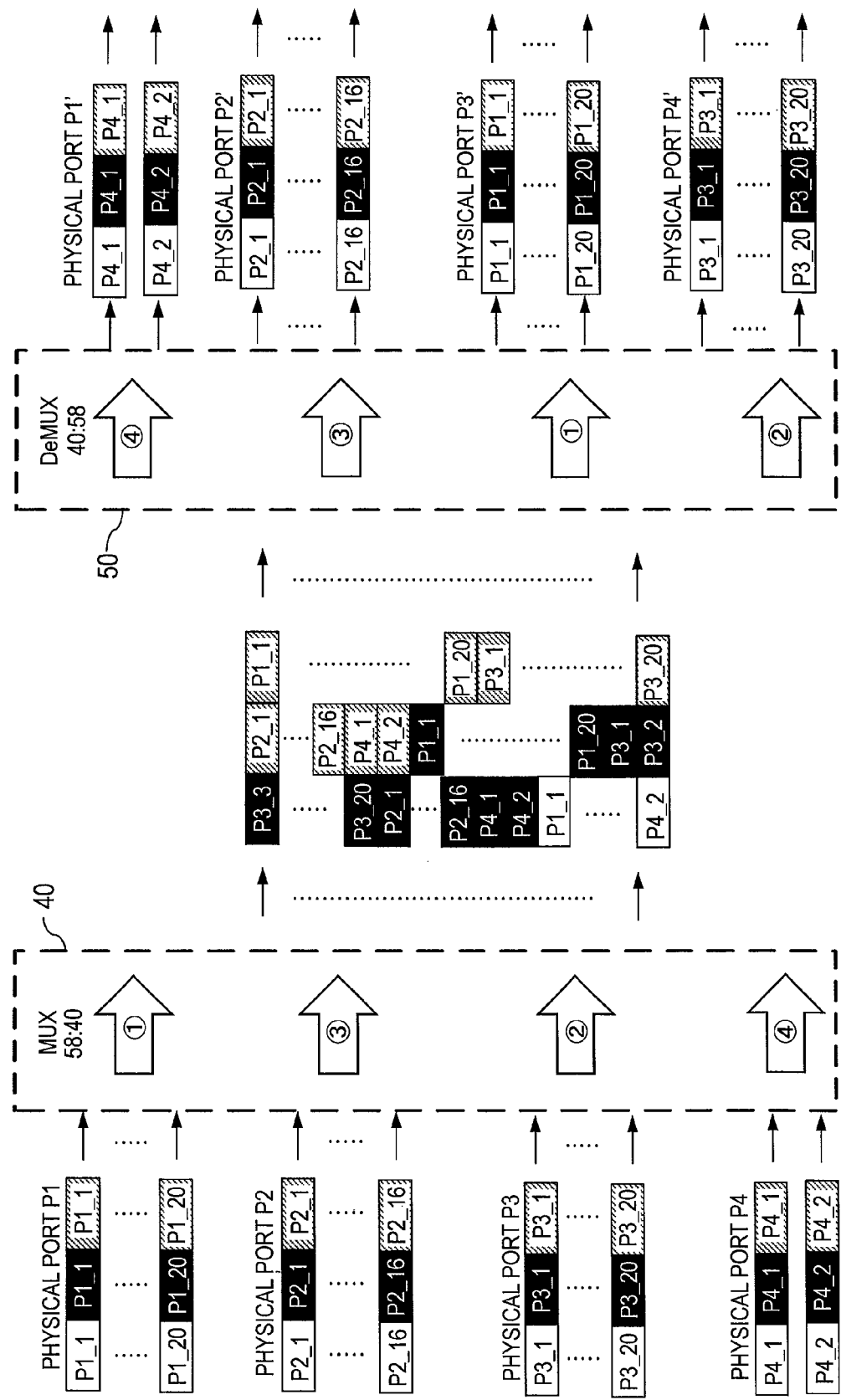
FIG. 13 is explanatory diagram 2 illustrating transport example in the transport system in which the multiplexer is installed in the transmitting-side transport apparatus and the demultiplexer is installed in the receiving-side transport apparatus.
Figure 14:
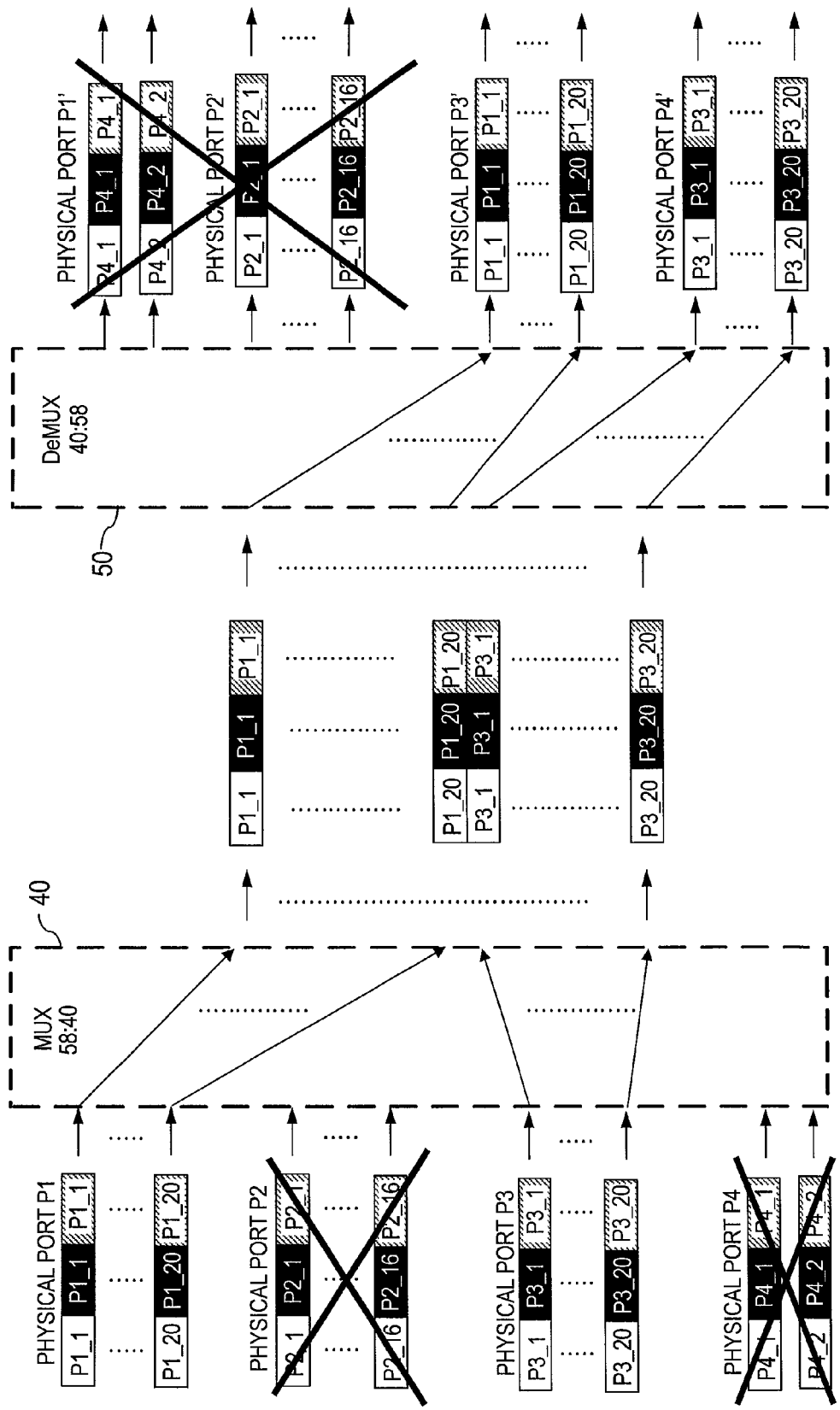
FIG. 14 is explanatory diagram 3 illustrating transport example in the transport system in which the multiplexer is installed in the transmitting-side transport apparatus and the demultiplexer is installed in the receiving-side transport apparatus.

FIGS. 12 to 14 are explanatory diagrams illustrating transport examples in the transport system 100 in which the multiplexer 40 is installed in the transmitting-side transport apparatus and the demultiplexer 50 is installed in the receiving-side transport apparatus. The transport apparatus of this embodiment are capable of transporting data on a port-by-port basis and, with the multiplexer 40 and the demultiplexer 50 provided in the transport system 100, the order of data multiplexing and data demultiplexing can therefore be changed on a port-by-port basis. In addition, which port is to be used for multiplexing or demultiplexing can be selected, and paths can therefore be selected flexibly in a manner suited to multiple rates.

FIG. 12 illustrates an example of the operation of the multiplexer 40 and the demultiplexer 50 which are included in the transport system 100. In this operation, when the multiplexer 40 has a ratio of 58:40, for example, the transmitting-side transport apparatus multiplexes input data of fifty-eight lanes in order from the physical port P1 to the physical port P4, and outputs the multiplexed data as data of forty lanes. The demultiplexer 50 that has a ratio of 40:58 demultiplexes input data of forty lanes in order from P1 to P4, and outputs the demultiplexed data as data of fifth-eight lanes.

In FIG. 13, physical port-by-physical port basis control is made possible with the use of a port number-valid lane count association table provided by the management unit 20. The order of multiplexing input data of fifty-eight lanes and the demultiplexing order can therefore be changed, as well as physical ports of the local and physical ports of the remote.

For instance, the transmitting-side transport apparatus multiplexes data of the physical ports P1, P3, P2, and P4 in the order stated, following a port number-valid lane count association table which is provided by the management unit 20, and outputs the multiplexed data as data of forty lanes. The 40:58 demultiplexer follows association table information, which is included in a marker inserted in the data, in demultiplexing the input data of forty lanes in order of P1, P3, P2, and P4. The association table information further allows the demultiplexer to change transmitting-side physical ports and physical ports of the remote so that data of the physical port P1 of the local is changed to data of the physical port P3' of the remote, while data of P2 is changed to data of P2', data of P3 is changed to data of P4', and data of P4 is changed to data of P1'. The demultiplexer outputs the changed data as data of fifth-eight lanes.

FIG. 14 illustrates an operation of multiplexing data of the physical ports P1 and P3 preferentially. For example, the multiplexer 40 multiplexes data of only the physical ports P1 and P3 and outputs the multiplexed data as data of forty lanes. The 40:58 demultiplexer follows association table information, which is included in a marker inserted in the data, in demultiplexing the input data of forty lanes. The association table information further allows the demultiplexer to change physical ports of the transmitting-side transport apparatus and physical ports of the receiving-side transport apparatus so that data of the physical port P1 (P3) of the local apparatus is changed to data of the physical port P3' (P4') of the receiving-side transport apparatus. The demultiplexer outputs the changed data as data of fifth-eight lanes.

Specifically, the user sets a priority level for each physical port in the transport apparatus, for example. The user may set priority so that, for example, transmission data from a high-speed physical port having a high transport rate is multiplexed/demultiplexed preferentially. In addition, the transport apparatus can be implemented by a single circuit, which enables the transport apparatus to have a small size, to deal with the user's requests flexibly, and to transport large-capacity data through multiple ports.

The transport system 100 according to this embodiment has a plurality of physical ports including ones for multi-lane transport, is capable of multiplexing data and transporting the multiplexed data, and is useful in a network where various link-layer protocols are used mixedly. In particular, the transport system 100 is capable of multiplexing and demultiplexing transmission data from a plurality of physical ports of different protocols or transport lane count, without depending on a specific link-layer protocol or a specific transport lane count. In addition, each transport apparatus of this embodiment can be implemented by a single circuit, and a small-sized transport apparatus with little delay that is capable of multi-rate transport of large-capacity data is thus accomplished.

This invention has been described in detail so far with reference to the accompanying drawings, but this invention is not limited to those specific configurations described above, and includes various changes and equivalent components within the gist of the scope of claims appended.

What is claimed is:

1. A transport system, comprising:
   a first transport apparatus for transporting data received by a plurality of first physical ports; and
   a second transport apparatus for receiving the data transported from the first transport apparatus and transmitting the received data from a plurality of second physical ports,
   wherein the first transport apparatus notifies, for each of the plurality of first physical ports, to the second transport apparatus, a valid first lane count indicating how many of a plurality of first lanes owned by the first physical port are valid, and identification information of the first physical port that owns the valid first lanes, and
   wherein the second transport apparatus is configured to:
      obtain, for each of the plurality of second physical ports, a valid second lane count indicating how many of a plurality of second lanes owned by the second physical port are valid, and identification information of the second physical port that owns the valid second lanes;
      associate, based on the valid second lane count and the identification information of the second physical port, and the valid first lane count and the identification information of the first physical port which are notified by the first transport apparatus, the identification information of the first physical port and the identification information of the second physical port; and
      transmit, when data including identification information of one of the plurality of first physical ports is transmitted from the first transport apparatus, the data from the second physical port that is identified by the identification information associated with the identification information of the one of the plurality of first physical ports which is included in the data
   wherein, when the identification information of the first physical port is associated with pieces of identification information of two or more second physical ports out of the plurality of second physical ports, the second transport apparatus associates so that identification information of only one second physical port out of the plurality of second physical ports is associated with the identification information of the first physical port.

2. The transport system according to claim 1, wherein the second transport apparatus associates the identification information of the first physical port and the identification information of the second physical port when the valid first lane count and the valid second lane count match.

3. The transport system according to claim 1,
   wherein the first transport apparatus comprises a multiplexer for multiplexing the data received by the plurality of first physical ports, and
   wherein the second transport apparatus comprises a demultiplexer for demultiplexing the multiplexed data from the first transport apparatus, uses the demultiplexer to demultiplex the multiplexed data, and transmits the demultiplexed data from the second physical port that is identified by the identification information associated with the identification information of the first physical port.

4. The transport system according to claim 3, wherein the first transport apparatus is capable of setting one of the plurality of first physical ports as a specific first physical port which has priority over other of the plurality of first physical ports, and the multiplexer multiplexes data received by the specific first physical port out of the plurality of first physical ports to transmit the multiplexed data to the second transport apparatus.

5. The transport system according to claim 1,
   wherein, when the first transport apparatus is set as a master and the second transport apparatus is set as a slave, the second transport apparatus notifies, to the first transport apparatus, information indicating an association relation between the identification information of the first physical port and the identification information of the second physical port, and
   wherein, based on the information indicating the association relation, the first transport apparatus associates the identification information of the first physical port and the identification information of the second physical port, and, after finishing associating the identification information, transmits pieces of data respectively received by the plurality of first physical ports to the second transport apparatus.

6. The transport system according to claim 5,
   wherein, when the valid second lane count and the identification information of the second physical port that owns the valid second lanes are obtained, the second transport apparatus notifies the valid second lane count, the identification information of the second physical port, and information that is not to be updated to the first transport apparatus, and
   wherein, when receiving the valid second lane count, the identification information of the second physical port, and the information that is not to be updated which are notified by the second transport apparatus, the first transport apparatus avoids associating the identification information of the first physical port with the identification information of the second physical port.

7. A transport method performed in a transport system,
   the transport system comprising:
      a first transport apparatus for transporting data received by a plurality of first physical ports; and
      a second transport apparatus for receiving the data transported from the first transport apparatus and transmitting the received data from a plurality of second physical ports,
   the method comprising:
   notifying, by the first transport apparatus, for each of the plurality of first physical ports, to the second transport apparatus, a valid first lane count indicating how many of a plurality of first lanes owned by the first physical port are valid, and identification information of the first physical port that owns the valid first lanes;

obtaining, by the second transport apparatus, for each of the plurality of second physical ports, a valid second lane count indicating how many of a plurality of second lanes owned by the second physical port are valid, and identification information of the second physical port that owns the valid second lanes;

associating, by the second transport apparatus, based on the valid second lane count and the identification information of the second physical port, and the valid first lane count and the identification information of the first physical port which are notified by the first transport apparatus, the identification information of the first physical port and the identification information of the second physical port; and transmitting, by the second transport apparatus, when data including identification information of one of the plurality of first physical ports is transmitted from the first transport apparatus, the data from the second physical port that is identified by the identification information associated with the identification information of the one of the plurality of first physical ports which is included in the data, wherein, when the identification information of the first physical port is associated with pieces of identification information of two or more second physical ports out of the plurality of second physical ports, the second transport apparatus associates so that identification information of only one second physical port out of the plurality of second physical ports is associated with the identification information of the first physical port.

* * * * *